(12) United States Patent
Klages et al.

(10) Patent No.: US 11,400,732 B2
(45) Date of Patent: Aug. 2, 2022

(54) MARKING SYSTEM FOR MARKING A MARKING OBJECT

(71) Applicant: Phoenix Contact GmbH & Co. KG, Blomberg (DE)

(72) Inventors: Kilian Klages, Detmold (DE); Alexander Hofmann, Hameln (DE); Peter Isaak, Detmold (DE); Torben Rheker, Marienmuenster (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 17/056,766

(22) PCT Filed: May 2, 2019

(86) PCT No.: PCT/EP2019/061256
§ 371 (c)(1),
(2) Date: Nov. 19, 2020

(87) PCT Pub. No.: WO2019/223981
PCT Pub. Date: Nov. 28, 2019

(65) Prior Publication Data
US 2021/0206177 A1 Jul. 8, 2021

(30) Foreign Application Priority Data
May 22, 2018 (BE) .................................. 2018/5326

(51) Int. Cl.
*B41J 2/44* (2006.01)
*B41J 3/28* (2006.01)
(Continued)

(52) U.S. Cl.
CPC ............... *B41J 2/442* (2013.01); *B41J 3/286* (2013.01); *B41J 3/4075* (2013.01); *B41J 3/413* (2013.01);
(Continued)

(58) Field of Classification Search
CPC . B41J 2/442; B41J 3/4075; B41J 3/413; B41J 11/008; G06F 21/44
See application file for complete search history.

(56) References Cited

U.S. PATENT DOCUMENTS

| 6,356,196 B1 | 3/2002 | Anderson et al. |
| 2004/0031931 A1 | 2/2004 | Mueller et al. |

(Continued)

FOREIGN PATENT DOCUMENTS

| CN | 107599631 A | 1/2018 |
| DE | 102010037564 A1 | 2/2012 |

(Continued)

*Primary Examiner* — Matthew Luu
*Assistant Examiner* — Kendrick X Liu
(74) *Attorney, Agent, or Firm* — Leydig, Voit & Mayer, Ltd.

(57) ABSTRACT

A marking system (1) for marking a marking object (2) comprises a marking device (13) for attaching a marking (20) on a marking object (2), a detection device (15, 16) for detecting identification information (300) associated with the marking object (2), and a control device (10) for controlling the marking device (13), the control device (10) being designed to authenticate identification information (300) detected by the detection device (15, 16) and to control the marking device (13) on the basis of the authentication. In this way, a marking system for marking a marking object is provided, which makes reliable marking of permitted marking objects possible.

14 Claims, 4 Drawing Sheets

(51) Int. Cl.
  *B41J 3/407* (2006.01)
  *G06F 21/44* (2013.01)
  *B41J 3/413* (2006.01)
  *B41J 11/00* (2006.01)
(52) U.S. Cl.
  CPC ............ *B41J 11/008* (2013.01); *G06F 21/44* (2013.01); *B41J 3/4073* (2013.01)

(56) References Cited

U.S. PATENT DOCUMENTS

| | | |
|---|---|---|
| 2008/0129037 A1 | 6/2008 | Holz et al. |
| 2009/0057421 A1 | 3/2009 | Holz |
| 2010/0189488 A1 | 7/2010 | Thorsten |
| 2013/0248603 A1* | 9/2013 | Schierholz ............. B41J 11/009 235/462.01 |
| 2013/0314488 A1 | 11/2013 | Bier |

FOREIGN PATENT DOCUMENTS

| | | |
|---|---|---|
| EP | 2193031 B1 | 6/2010 |
| WO | WO 2012065816 A1 | 5/2012 |

\* cited by examiner

MARKING SYSTEM FOR MARKING A MARKING OBJECT

CROSS-REFERENCE TO PRIOR APPLICATIONS

This application is a U.S. National Phase application under 35 U.S.C. § 371 of International Application No. PCT/EP2019/061256, filed on May 2, 2019, and claims benefit to Belgian Patent Application No. BE 2018/5326, filed on May 22, 2018. The International Application was published in German on Nov. 28, 2019 as WO 2019/223981 under PCT Article 21(2).

FIELD

The invention relates to a marking system for marking a marking object and to a method for operating a marking system.

BACKGROUND

Such a marking system includes a marking device for applying a marking to a marking object.

A marking system of this kind serves, in particular, to manufacture marking objects in the form of inscribed marking labels. Such marking labels may be made of metal, for example, stainless steel or aluminum, or of plastic, and are provided with a permanent inscription, for example, using a laser, using ink-jet printing, or using thermal transfer printing. Such marking labels may be used to mark, for example, electrical (or other) cables or electrical assemblies, such as wire terminal devices, to thereby provide an identification on cables or electrical assemblies.

Conventionally, marking objects to be inscribed are fed to a marking system, such as, for example, a laser inscription system, by feeding to the marking system a plurality of marking objects, for example six marking objects, on a carrier, for example in the form of a film referred to as a liner. The carrier may have applied thereto an identifier, for example in the form of a barcode, which can be captured by the marking system to set operating parameters of the marking system, such as operating parameters for a laser device of the marking system, based on the identifier.

Apart from the function of carrying the marking objects to be inscribed, such a carrier has no function once the marking objects are inscribed, and increases the costs of the marking objects to be inscribed. Therefore, it is generally desirable to dispense with such a carrier. However, in this connection, it must be ensured that a marking system correctly inscribes the marking objects fed thereto, and that it processes only marking objects that are permitted to be processed by the marking system. In particular, in the case of a marking system in the form of a laser inscription system, it must be ensured that no (excessive) emissions (e.g., release of particles) can occur due to the use of incorrect operating parameters.

WO 2012/065816 A1 describes a marking system in the form of a laser inscription unit, where marking objects are conveyed by a rotary table into the region of a supporting surface so as to be inscribed using a laser beam.

DE 10 2010 037 564 A1 describes a printing object and a printer for printing a printing object. A barcode identifier including a plurality of individual bars arranged one behind the other is provided on the printing object, making it possible to ensure optimal printing for the printing object.

EP 2 193 031 B1 describes a marking object including an object carrier and several markable object blanks held by the object carrier. The object carrier includes at least one identification means containing at least one items of information relating to the marking object.

SUMMARY

In an embodiment, the present invention provides a marking system for marking a marking object, the marking system comprising: a marking device configured to apply a marking to the marking object; a capture device configured to capture identification information associated with the marking object; and a control device configured to control the marking device, the control device being configured to authenticate the identification information captured via the capture device as an authentication and to control the marking device based on the authentication.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
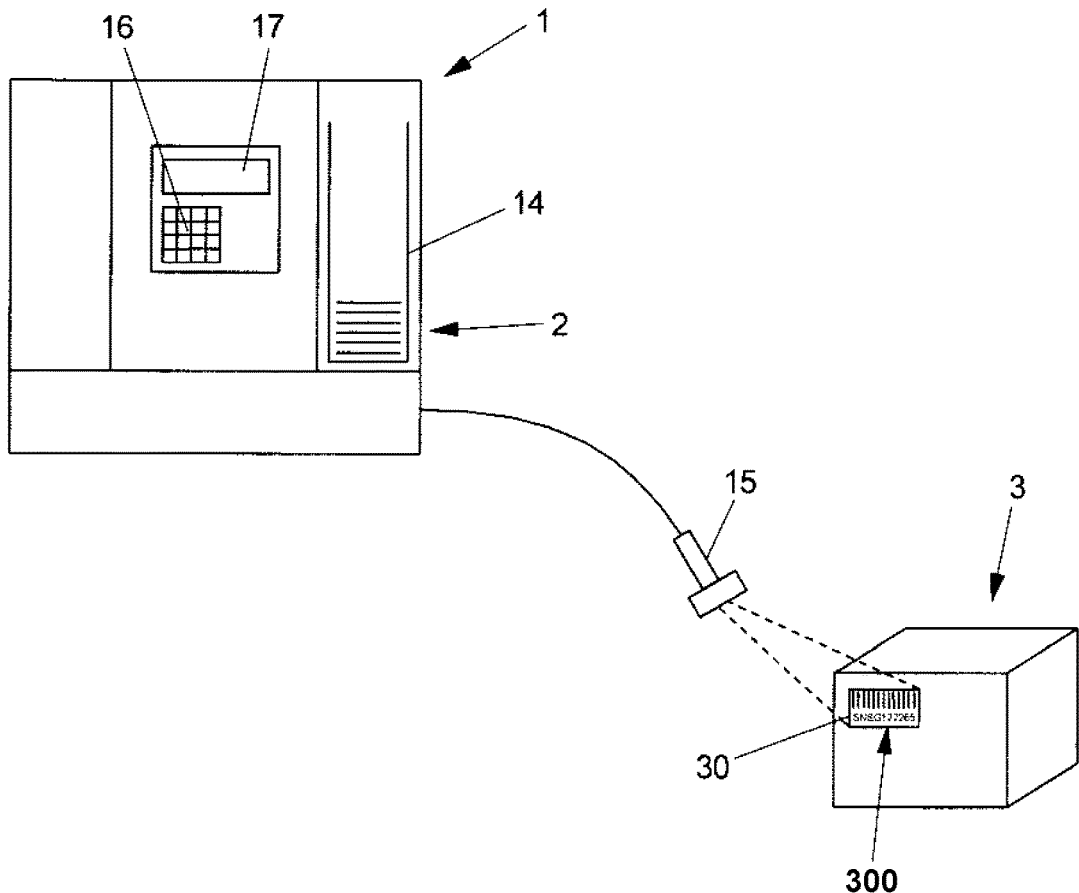
FIG. 1 is a schematic view of a marking system.

Embodiments of the present invention provide a marking system for marking a marking object and a method for operating a marking system which allow for reliable marking of permitted marking objects, possibly without the use of a carrier.

Accordingly, the marking system includes a capture device for capturing identification information associated with the marking object, and a control device for controlling the marking device, the control device being configured to authenticate the identification information captured via the capture device and to control the marking device based on the authentication.

The capture device serves to capture identification information that is associated with the marking object. Based on the captured identification information, an authentication is then performed during which it is determined whether the marking object is a permitted marking object that can be inscribed by the marking system. Thus, prior to performing a marking operation, an authentication of a marking object to be inscribed is performed, thereby preventing marking objects from being impermissibly inscribed in the marking system.

Thus, the marking device of the marking system can be controlled in different ways depending on the authentication such that if the authentication is successful, a marking operation is performed as desired, whereas if the authentication is not successful, a marking operation is possibly not even started or is performed with modified operating parameters (as compared to the normal, intended marking process).

The marking object may be, for example, a planar marking label which is made (completely or partially) from a metal material, for example, stainless steel or aluminum, or from a plastic material or a ceramic or glass material. Such marking labels may be present separately and may be provided in stacked form, for example in a container such as a packaging carton or the like, or in a magazine of the marking device.

Such marking fields may, for example, also be coated.

The authentication of the captured identification information is accomplished, for example, through matching with valid identifiers which, as such, are stored, for example in a storage device of the marking system. For purposes of authentication, the control device performs matching by comparing the captured identification information to the identifiers that are stored as valid in the storage device. If it is determined that the captured identification information matches a valid identifier, then the authentication is successful. If no match is found between the captured identification information and an identifier stored as valid in the storage device, then the authentication is not successful.

Storing valid identifiers in the storage device of the marking system has the advantage that the authentication can also be performed without the marking system being in communication connection with external systems, so that the marking system can operate off-line.

Alternatively, the matching of the captured identification information with valid identifiers may be accomplished by the marking system communicating via a suitable communication connection, such as a network connection via the Internet, with an external authentication unit, for example, at the location of the manufacturer of the marking system or of the marking objects, to thereby authenticate the captured identification information. In this case, the valid identifiers are not stored in the marking system itself, but are present at the site of the authentication unit, so that the authentication is accomplished through communication with the external authentication unit.

The authentication may possibly be performed in two steps. For example, in a first step, it may be checked whether the captured identification information is actually a permitted item of identification information, that is, for example, identification information having a predetermined format that can be attributed to a predetermined manufacturer. If it is determined that the identification information does not have a permitted format, then the authentication may already be terminated as unsuccessful. Upon successful completion of the first step, it may be checked in a second step whether the identification information that is, in principle, permitted is also (still) valid. For example, it may be provided as a general principle that identification information in the form of, for example, a serial number of a marking object can only be used once. If a serial number has already been used in a marking operation, and if marking objects of a particular serial number have already been marked, then execution of another marking operation under the same serial number may possibly be prevented.

Accordingly, it may be provided that a valid identifier stored in the storage device be set as invalid if, during authentication, it is determined by matching with the captured identification information that the stored identifier matches the captured identification information. Since the (previously) valid identifier is now set as invalid, it is ensured that identification information matching this identifier can only be used once, so if the same identification information is captured again, this does not result in a successful authentication.

The identification information may also contain information regarding operating parameters to be used during a marking operation of the marking object, or the marking device may be controlled to use specific operating parameters based on the capture of the identification information.

Based on the identification information, it is possible, for example, to identify the type (size and material) of a marking object, so that the marking device will be controlled with parameters suitable for the inscription of the marking object. The operating parameters may include, for example, the intensity of a laser beam and/or the feed rate of a laser beam during marking. For example, in case of a marking system in the form of a laser inscription system, different laser beam intensities may have to be used for different materials of different marking objects.

Depending on the authentication result, the control device may control the marking device, for example in accordance with different operating modes. For example, a first operating mode may speak a normal, intended marking operation upon successful authentication, during which operation the marking device marks a marking object to be inscribed in the intended manner using predetermined operating parameters. In contrast, the second operating mode may differ from the first operating mode and is executed if the authentication is not successful. In the second operating mode, the marking device may, for example, not even be triggered to apply a marking to the marking object, or a marking operation is performed, but with modified operating parameters as compared to the first operating mode, for example, at a considerably reduced marking speed and/or laser beam intensity (in the case of a marking system in the form of a laser inscription system).

Thus, depending on the authentication, the marking object to be inscribed is either marked in the normal, intended manner, or not. If the authentication is successful, it is ensured that the marking object is a permitted marking object that can be inscribed by the marking system and whose properties (for example, the size and material) are known, and for which a marking operation may be performed with suitable operating parameters intended for the marking object. In contrast, if the authentication is not successful, no marking is performed at all, or marking is performed, but with significantly modified operating parameters, thereby efficiently preventing, in particular, undesirable emissions during marking.

A marking object to be inscribed may be delivered, for example, by a manufacturer, in a container, for example in the form of a packaging carton or the like, along with other marking objects. Such a container may have applied thereto an identifier that is associated with the marking object and contains the identification information. The identification information contained in the identifier is input into the marking system or captured by the marking system and is then authenticated by the control device, so that, prior to performing a marking operation, it is determined whether marking objects contained in the container can be inscribed by the marking system and, if so, which operating parameters may have to be used for this process.

The identification information may be indicated in the form of a product code and a serial number as such on the container. It is also conceivable, however, that the identification information is applied to the container in encrypted form or is present in another form, so that a user does not (directly) get to know the identification information itself. For example, the identification information may include a product code and a serial number which, however, are not indicated as such, for example on the container, in the form of plain text, but rather are encrypted by an encryption method (e.g., using RSA technology) using a key (known to the marking system). Thus, the identification information is captured in encrypted form and decrypted in the marking system (using the key known to the marking system) to then authenticate the captured identification information upon decryption.

In an embodiment, the capture device takes the form of a scanning device for scanning the identification information. Such a scanning device may, for example, be configured for scanning a barcode, a QR code, or an RFID tag to thereby input the identification information from the barcode, the QR code, or from the RFID tag.

Alternatively, the capture device may also take the form of a keypad for manually inputting the identification information. In this case, a user reads the identification information, for example from the container containing one or more marking objects, and inputs it into the marking system via the keypad.

In yet another embodiment, the identification information may also be input into the marking system by what is known as batch import; i.e., by successively inputting a sequence of identification information items for marking objects to be successively inscribed using information technology.

The marking device is preferably configured with a laser device having a laser for generating a laser beam for inscribing the marking object. Thus, the marking system constitutes a laser inscription system with which a marking in the form of characters and/or graphic elements is applied to a marking object, such as a marking label made of metal or plastic.

However, it is also conceivable and possible that the marking system is configured for inscribing the marking object by ink-jet printing or thermal transfer printing. To this end, the marking device may be configured with an ink-jet printing device or a thermal transfer printing device.

An embodiment provides a method for operating a marking system for marking a marking object. In this method, a marking is applied to a marking object using a marking device. The method provides that a capture device capture identification information associated with the marking object, and that a control device authenticate the identification information captured via the capture device and control the marking device based on the authentication.

The advantages and advantageous embodiments described above with respect to the marking system are also applicable to the method, and thus, reference is made to the above discussion.

A marking system 1 schematically shown in FIG. 1 serves to inscribe marking objects 2, which may be present, for example, as marking labels. In the illustrated exemplary embodiment, marking system 1 is configured as a laser inscription system and may process, for example, marking objects 2 in the form of marking labels made of metal, for example, stainless steel or aluminum, or of plastic.

Figure 4:
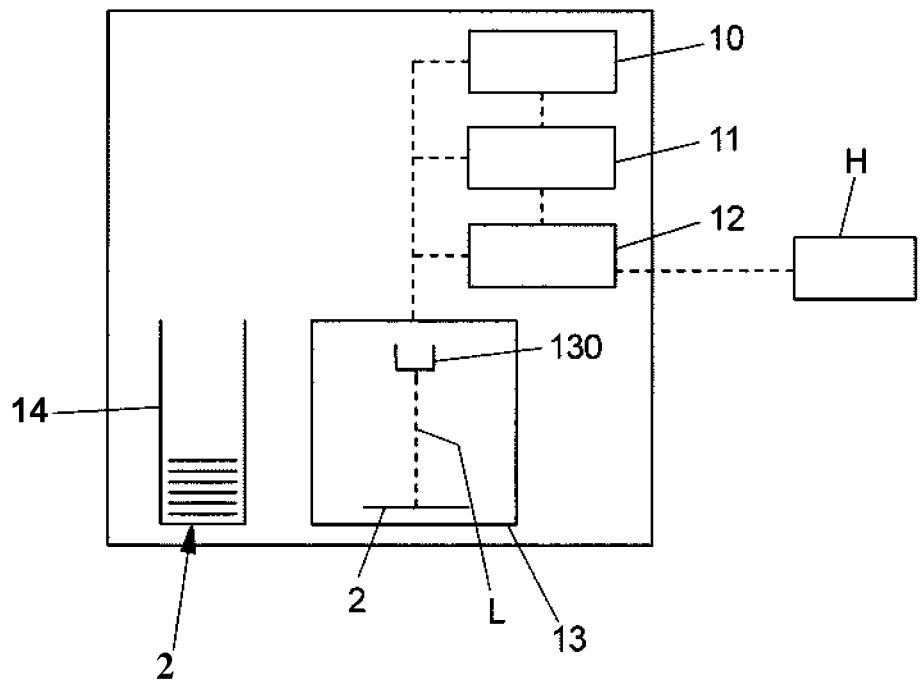
FIG. 4 is a schematic view illustrating the functional design of the marking system.
Figure 5:
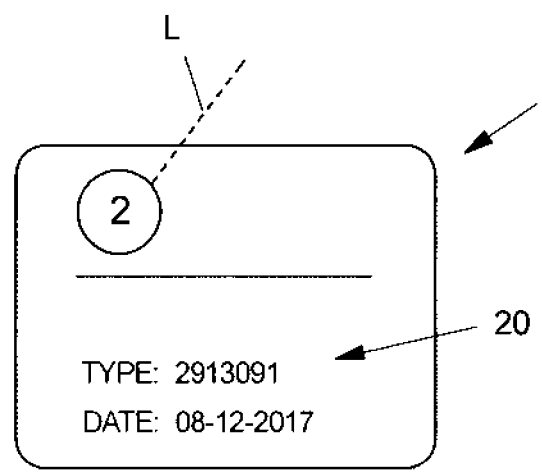
FIG. 5 is a schematic view of a marking object in the form of a marking label.

As illustrated in the schematic view of FIG. 4, marking system 1 includes a marking device 13 having a laser device 130 for generating a laser beam L by means of which marking objects 2 can be provided with an inscription 20 including, for example, text or graphic elements 20, as illustrated in FIG. 5. To this end, marking objects 2 are separately fed from a magazine 14 so as to be inscribed by marking device 13 by means of laser beam L.

Marking device 13 is controlled by a control device 10. A storage device 11 may store, for example, operating parameters for controlling marking device 13, and a communication with an external communication unit H may be provided via a communication device 12. Information may be output via an indicating device 17 in the form of a display.

Figure 6:
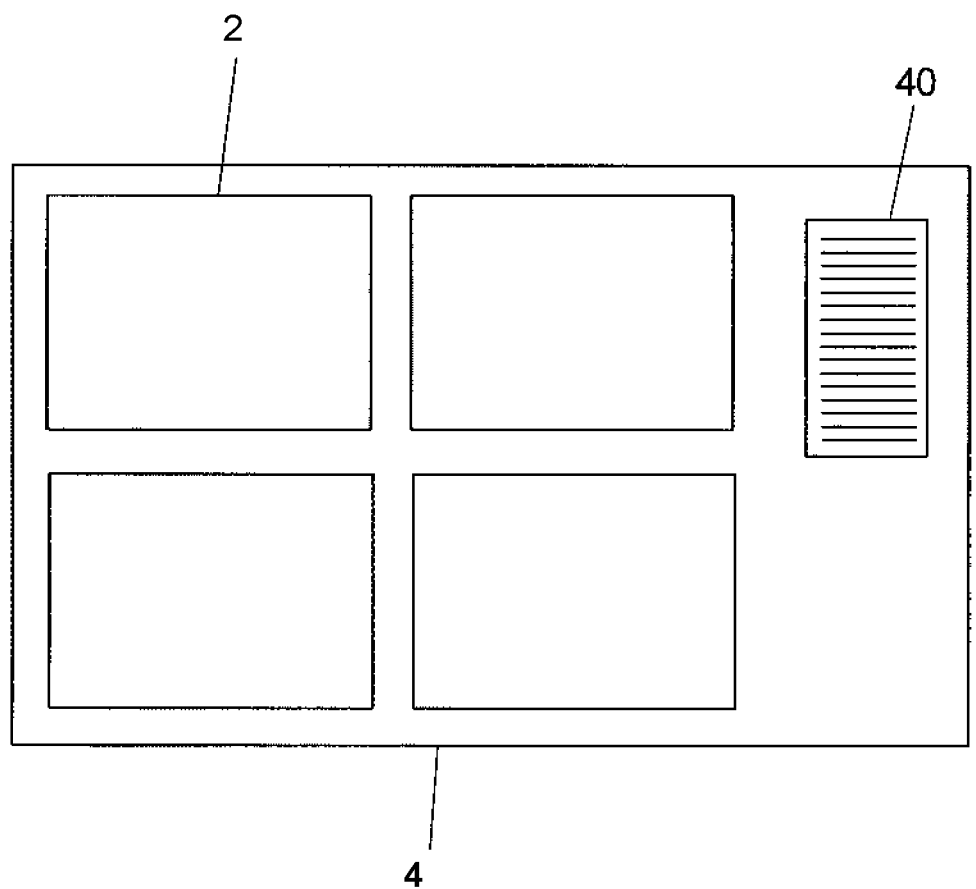
FIG. 6 is a schematic view of marking objects in the form of marking labels arrayed on a carrier.

In a conventional marking system, in order to inscribe marking objects 2, marking objects 2 on a carrier 4 in the form of a liner formed by a film are jointly fed to a marking device in order to inscribe marking objects 2 in one operation, as illustrated by way of example in FIG. 6. Operating parameters to be used for the inscription of marking objects 2 can be identified via an identifier 40 applied to carrier 4, for example in the form of a barcode, so that marking objects 2 can be inscribed in a controlled manner.

A carrier 4, such as is shown in FIG. 6, has no function once the inscription is completed. Rather, after the inscription is completed, marking objects 2 are removed from carrier 4 and put to their intended use, for example, to identify an electrical device or the like. It may therefore be desirable to dispense with such a carrier 4, which may in particular provide cost advantages.

Figure 2:
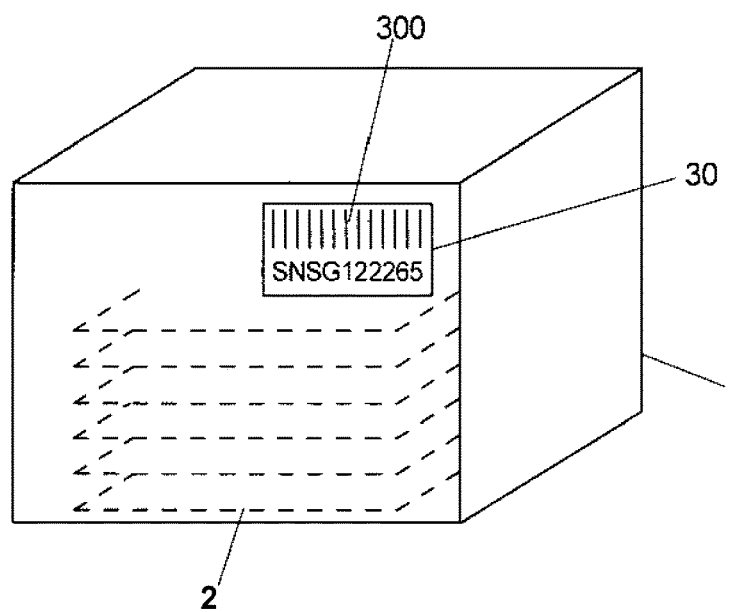
FIG. 2 is a schematic view of a container having applied thereto an identifier containing identification information.

In a departure from the practice of identifying marking objects 2 to be inscribed via an identifier applied to a carrier, the marking system 1 shown in FIGS. 1 and 4 is intended to process marking objects 2 which are delivered in separated form, for example in a container 3 in the form of a packaging, as illustrated in FIG. 2, and are used by a user of marking system 1. For purposes of identification and, in particular, authentication of marking objects 2, identification information 300 is used which is provided on container 3 by means of an identifier 30 and may be input via a capture device in the form of a scanning device 15 or manually entered by a user via a keypad 16 (see FIG. 1). Based on identification information 300, marking system 1 is controlled to perform a marking operation for applying an inscription to a respective marking object 2.

Figure 3:
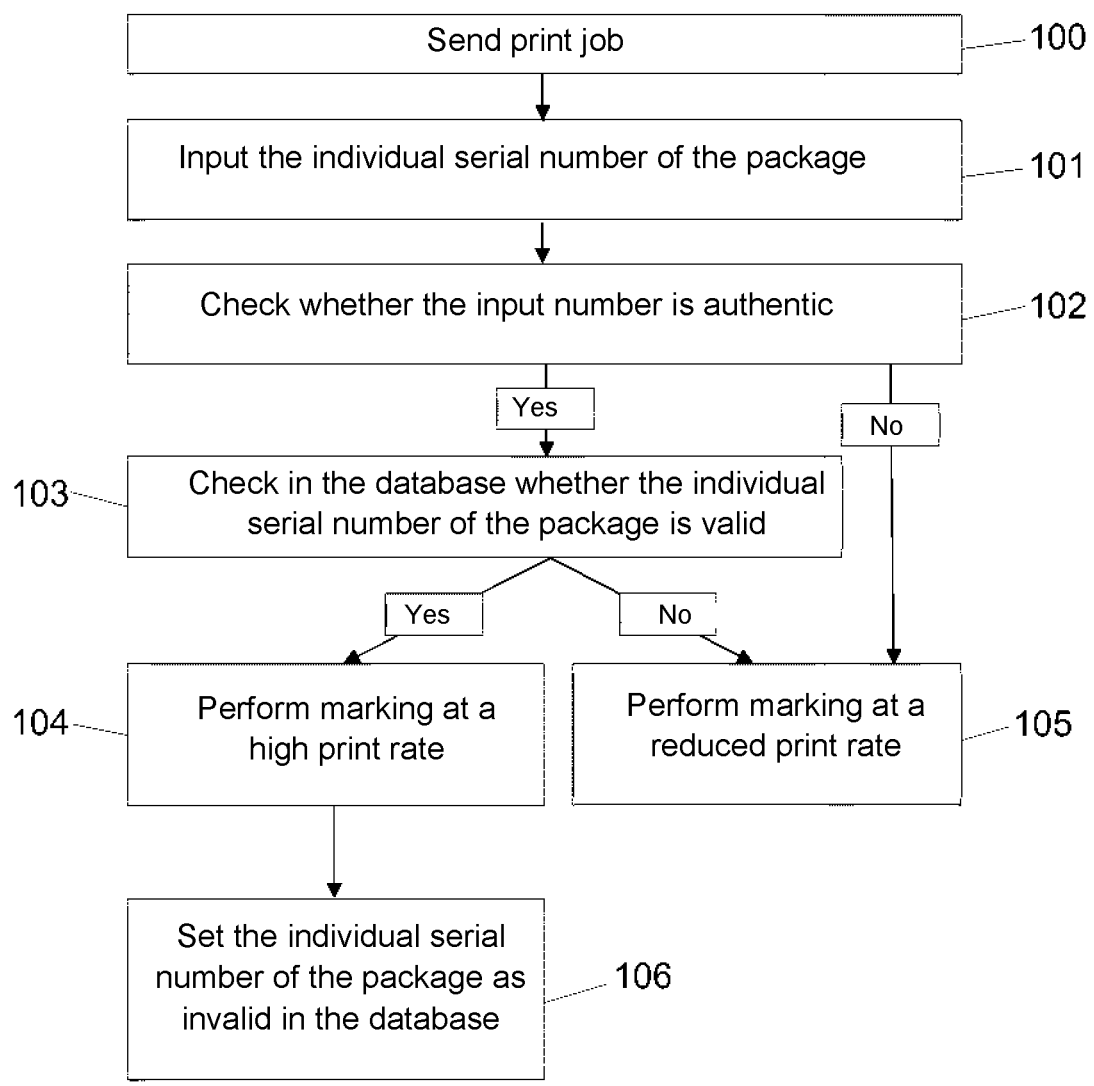
FIG. 3 is a flow chart illustrating the sequence of a marking operation.

The sequence of a marking operation is then, for example, as illustrated in FIG. 3. Thus, initially (step 100), a print job is created, for example, by suitable software, and sent to marking system 1, just as is the case with conventional printing processes. In the next step 101, a user is prompted, for example, to input, via keypad 16 or scanning device 1, an individual serial number 5 that is associated with marking object 2 to be described and is indicated on package 3 of marking object 2, for example, as identification information 300.

Based on the so-captured identification information 300, control unit 10 of marking system 1 then checks whether the captured identification information 300 is authentic by checking, for example, whether the input identification information 300 actually has a known, predetermined format and as such constitutes a permitted, valid identification information (step 102).

If this first authentication step is successful, it is checked in a second authentication step whether the captured identification information 300 responds to a valid identifier. To this end, control device 10 performs matching of the captured identification information 300 with, for example, valid identifiers stored in storage device 11. To this end, control device 10 compares the captured identification information 300 to stored identifiers, and if an identifier responding to the captured identification information 300 exists, identification information 300 is identified as valid. Thus, a marking operation can be performed in the intended manner at a high print rate, for example, at a maximum marking speed (step 104). For this purpose, in addition, operating parameters of marking device 13, such as a laser intensity, may be suitably adjusted based on the identified identification information 300 and the thereby identified marking object 2 (for example, as a function of the material of marking object 2).

In step 106, the identifier stored in storage device 11 that matches identification information 300 is now set as invalid to prevent the same identification information 300 from being used again.

If the same identification information 300 is captured again, this results in an unsuccessful authentication.

If the authentication in first step 102 or in second step 103 is not successful, it is conceivable that a marking operation is not even started, and so a marking object 2 is not inscribed.

Alternatively, however, it is also possible (as illustrated in FIG. 3) that a marking operation is nevertheless performed, but with other operating parameters, for example, at a reduced marking speed (e.g., at 1/100 of the speed as compared to successful authentication) and/or at reduced laser power (in the case of laser inscription). Thus, an inscription operation is performed, but at reduced speed and possibly with other operating parameters, for example, at a reduced intensity of a laser beam L used. Thus, an inscription operation may be performed even in the case of marking objects 2 which are not identified and correctly authenticated, while nevertheless reducing undesirable emissions, for example, release of particles.

Identification information 300 may, for example, be present in the form of plain text or encoded in a barcode, a QR code, a RFID tag, a pictograph or logo, or in an embossing. Accordingly, scanning device 15 may be configured, for example, to read information from a barcode, a QR code, or an RFID tag.

The identification information 300 contained in identifier 30 may be present in encrypted form. For example, if identifier 30 contains plain text, then this plain text may not indicate the actual identification information 300 that identifies marking object 2 (e.g., a product code or a serial number), but may contain the identification information 300 in encrypted form. In this case, control device 10 is configured to decrypt the captured identification information 300 using a key that is known to it (and which was used to encrypt the identification information 300 contained in identifier 30) so as to perform the authentication in marking system 1 based on the decrypted identification information 300 obtained from identifier 30.

The encryption may be performed using, for example, a so-called RSA technology, where the identification information 300 contained in identifier 30 is encrypted during the creation of identifier 30 using a first (public) key at the site of the vendor of the marking objects 2 contained in container 3. Marking system 1 knows the first (public) key and, in addition, has a second (private) key, the keys being used together for decryption, so that the identification information 300 obtained from identifier 30 can be decrypted and processed in marking system 1 for purposes of authentication.

The authentication can, in principle, be accomplished as described above via valid identifiers stored in storage device 11. In this case, marking system 1 can be operated off-line without a communication connection, for example a network connection, to external units H having to exist during operation.

However, it is also conceivable and possible that the authentication is accomplished (in a manner controlled by control device 10) by the marking system 1 communicating via communication device 12 with an external unit H that has knowledge of valid identifiers and performs the authentication based on information transmitted by marking system 1 by matching the captured identification information 300 with valid identifiers.

The concept underlying the invention is not limited to the above-described exemplary embodiments, but may also be implemented in a completely different way.

The marking system is capable of inscribing completely different marking objects, such as marking objects of metal, for example, stainless steel or aluminum, or of plastic. Such marking objects may then be attached in inscribed form to, for example, an electrical device, such as a cable, a terminal device, or electrical equipment, to identify the electrical device and to indicate information regarding, for example, the operation of the electrical device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 marking system
10 control device
100-106 steps
11 storage device
12 communication device
13 marking device
130 laser device
14 magazine
15 scanning device
16 keypad
17 indicating device (display)
2 marking object (labels)
20 marking
3 container (package)
30 identifier
300 identification information
4 carrier (liner)

40 identifier
H communication partner
L laser beam

The invention claimed is:

1. A marking system for marking a marking object, the marking system comprising:
a marking device configured to apply a marking to the marking object;
a capture device configured to capture identification information associated with the marking object;
a control device configured to control the marking device, the control device being configured to authenticate the identification information captured via the capture device as an authentication and to control the marking device based on the authentication; and
a storage device configured to store a plurality of valid identifiers,
wherein the control device is configured to authenticate the identification information captured via the capture device based on the valid identifiers stored in the storage device, and
wherein the control device is configured to cause at least one valid identifier of the valid identifiers stored in the storage device that matches the captured identification information to be set as invalid.

2. The marking system as recited in claim 1, wherein the marking object comprises a marking label including a metal material or a plastic material.

3. The marking system as recited in claim 1, wherein the control device is configured to communicate via a communication connection with an external authentication unit to authenticate the identification information captured via the capture device.

4. The marking system as recited in claim 1, wherein the control device is configured to adjust at least one operating parameter of the marking device based on the captured identification information.

5. The marking system as recited in claim 1, wherein the control device is configured to control the marking device in a first operating mode to apply the marking to the marking object if the authentication is successful, and in a second operating mode different from the first operating mode if the authentication is not successful.

6. The marking system as recited in claim 5, wherein in the second operating mode, no marking is applied to the marking object.

7. The marking system as recited in claim 5, wherein the control device is configured to control the marking device in the second operating mode such that the marking is applied to the marking object, but with at least one operating parameter of the marking device differing from the first operating mode.

8. The marking system as recited in claim 1, wherein the identification information is contained in an identifier on a container associated with the marking object.

9. The marking system as recited in claim 1, wherein the identification information associated with the marking object and captured by the capture device is encrypted, the control device being configured to decrypt the captured identification information prior to authentication.

10. The marking system as recited in claim 1, wherein the capture device takes the form of a scanning device for scanning the identification information.

11. The marking system as recited in claim 1, wherein the capture device comprises a keypad configured to manually input the identification information.

12. The marking system as recited in claim 1, wherein the marking device includes a laser device, an ink-jet printing device, or a thermal transfer printing device configured to apply the marking to the marking object.

13. A method for operating a marking system for marking a marking object, comprising:
applying the marking object using a marking device,
wherein a capture device captures identification information associated with the marking object,
wherein a control device authenticates the identification information captured via the capture device as an authentication and controls the marking device based on the authentication,
wherein a storage device is configured to store a plurality of valid identifiers,
wherein the control device is configured to authenticate the identification information captured via the capture device based on the valid identifiers stored in the storage device, and
wherein the control device is configured to cause at least one valid identifier of the valid identifiers stored in the storage device that matches the captured identification information to be set as invalid.

14. A marking system for marking a marking object, the marking system comprising:
a marking device configured to apply a marking to the marking object;
a capture device configured to capture identification information associated with the marking object; and
a control device configured to control the marking device, the control device being configured to authenticate the identification information captured via the capture device as an authentication and to control the marking device based on the authentication,
wherein the control device is configured to control the marking device in a first operating mode to apply the marking to the marking object if the authentication is successful, and in a second operating mode different from the first operating mode if the authentication is not successful, and
wherein the control device is configured to control the marking device in the second operating mode such that the marking is applied to the marking object, but with at least one operating parameter of the marking device differing from the first operating mode.

* * * * *